Sheet 1–2 Sheets.

J. S. Marsh.
Harvester-Rake.

Nº 73619          Patented Jan. 21, 1868

Witnesses          Inventor

Sheet 2 — 2 Sheets

J. S. Marsh.
Harvester-Rake.

Nº 73619  Patented Jan. 21, 1868

Witnesses  Inventor

UNITED STATES PATENT OFFICE.

JAMES S. MARSH, OF LEWISBURGH, PENNSYLVANIA.

IMPROVEMENT IN HARVESTER-RAKES.

Specification forming part of Letters Patent No. 73,619, dated January 21, 1868.

*To all whom it may concern:*

Be it known that I, JAMES S. MARSH, of Lewisburgh, in the county of Union and State of Pennsylvania, have invented certain new and useful Improvements in Harvesters and Harvester-Rakes, of which the following is a full, clear, and exact description, reference being had to the accompanying drawings which make part of this specification, and in which—

Figure 1:
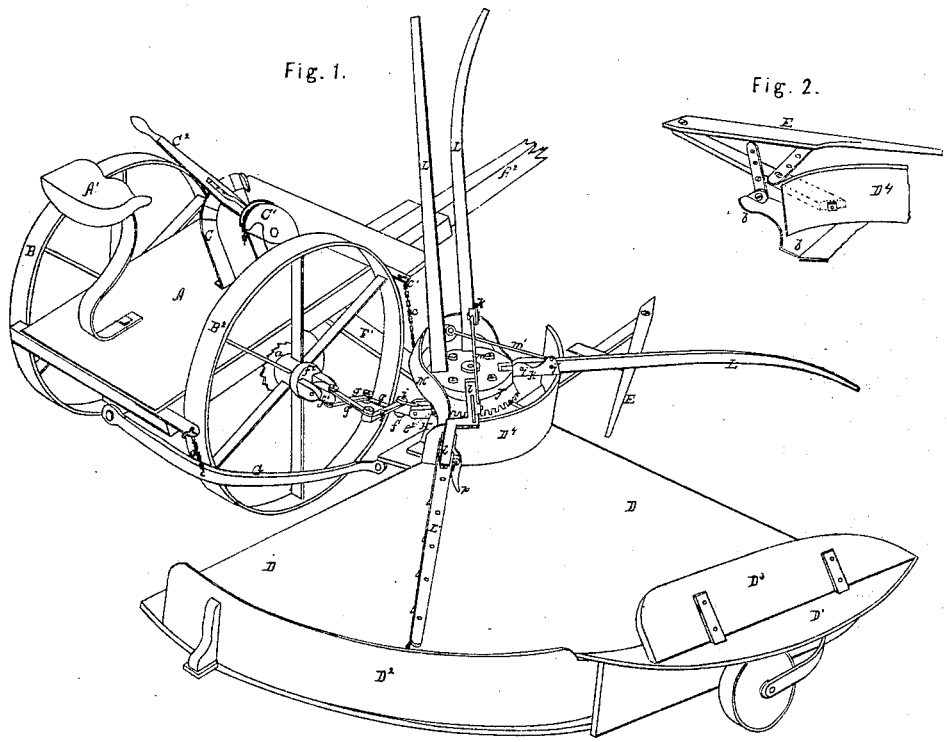
Figure 2:
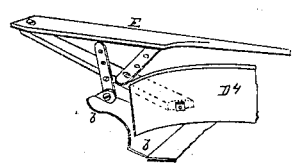
Figure 3:
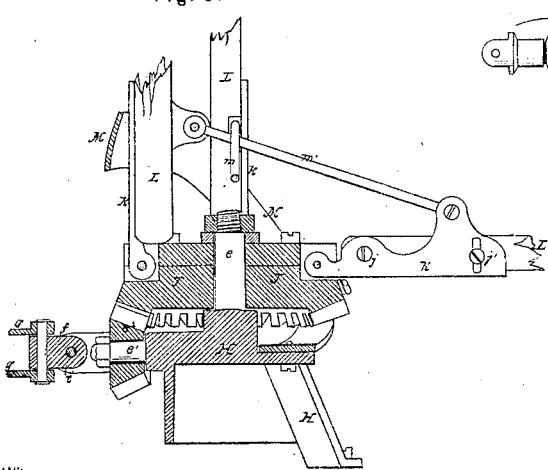
Figure 4:
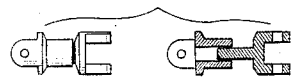
Figure 5:
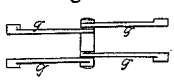
Figure 6:
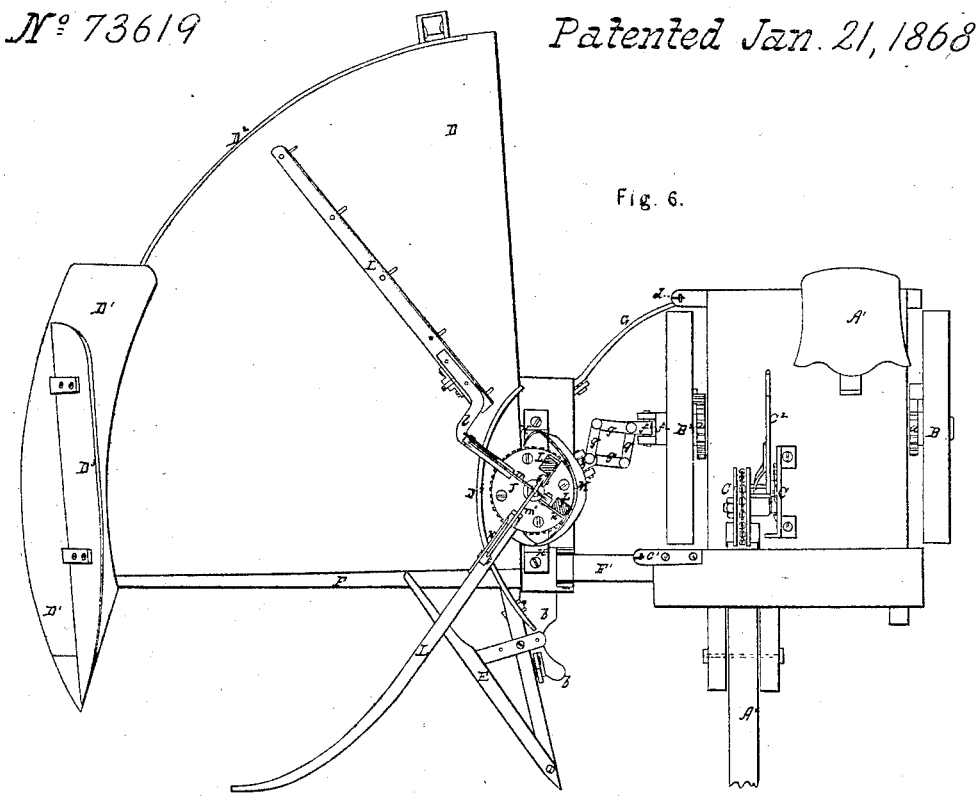
Figure 7:
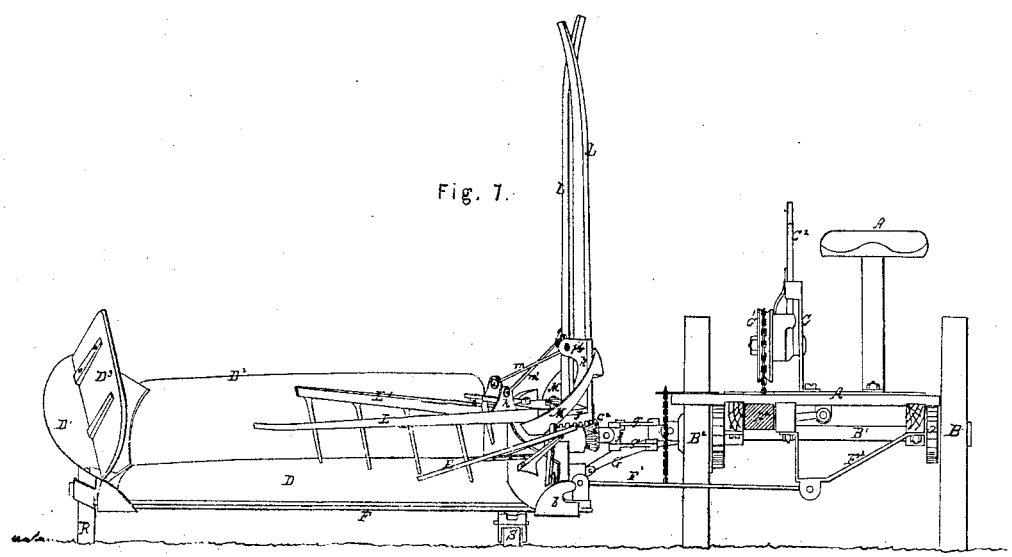

Figure 1 represents a view in prospective of so much of a harvester to which my improvements are applied, as is necessary to illustrate my invention. Fig. 2 is a similar view of the grain-guard or compressor, attached to the stubble-end of the finger-beam, detached. Fig. 3 represents a vertical central section through the devices which support and actuate the raking and reeling mechanism. Fig. 4 represents in elevation and section an extensible shaft for communicating motion from the main axle to the rake. Fig. 5 represents an extensible coupling to be used instead of the extensible shaft shown in Fig. 4. Fig. 6 represents a plan or top view; and Fig. 7, a view, in elevation, of the machine as seen from the front.

It is the object of my invention to adapt a rake and reel, revolving on a vertical axis, to a two-wheeled front-cut hinge-joint harvester, and the improvements herein claimed consist in certain novel combinations of mechanisms, hereinafter described, for attaining this result.

In the accompanying drawings, a suitable main frame, A, is shown as supported upon an axle, $B^1$, mounted upon two driving-wheels, B $B^2$, arranged outside the frame and turning loosely on the axle, with which they are connected by means of pawls and ratchets $a\ a$, in the usual way. These backing ratchets permit the wheels to slip on the axle, when backing, without moving the cutters, but engage with the axle when moving forward. If the rake is driven from one of the driving-wheels, the ratchets prevent the backing of the rake; if driven from the axle itself, a separate ratchet must be used.

A driver's seat, $A^1$, is mounted on the rear corner of the frame farthest from the rake, where the driver is well out of the way of the rake-arms, but at the same time within easy reach of the lifting-lever $C^2$.

The tongue $A^2$ is pivoted to play vertically between hounds arranged near the inner front corner of the main frame, (as shown in Fig. 6,) or on that side nearest the platform, so as to diminish the side draft as much as possible.

A chain or link is attached at one end to the rear end of the tongue, and at the other to a rocking sector, $C^1$, vibrating on a horizontal pivot or stud in a standard or frame, C, bolted to the frame and having ratchet-teeth on its face. The lifting-lever $C^2$ is pressed against these ratchet-teeth by a spring, as shown in the drawing, and thus holds the tongue in any desired position. The weight of the rake and the arrangement of the finger-beam in front of the wheels causes the front of the machine to preponderate; consequently, by moving the lever $C^2$ backward or forward, the front of the machine can be correspondingly raised or lowered.

A quadrant or sector-shaped platform, D, is connected with the main frame by coupling-arms F G, pivoted at both ends, so as to allow the platform to play freely up and down to conform to the undulations of the ground over which it is drawn. The front coupling-arm, $F^1$, is arranged in nearly the same vertical plane as the finger-beam F, and is pivoted at its upper end to a stirrup or down-hanger, $F^2$, underneath the main frame, and at the other to a lug on the shoe in the usual way. The rear coupling-arm G is similarly hinged to the under side of the main frame behind the driving-wheel $B^2$. These coupling-arms are suspended at any desired distance from the platform by means of chains, which take into slotted catches $c^1$ and $d$, on the projecting portions of the frame.

The platform D is constructed with an inclined outer divider, $D^1$, and a rear guard, $D^2$, which latter extends from the front point of the divider along the back edge of the platform, and terminates at the inner rear corner thereof, so as to prevent the grain from falling backward while it is being raked from the platform.

Upon the inclined surface of the divider $D^1$, and extending from its front point nearly to its rear end, is a deflecting-board, $D^3$, which is inclined in such manner as to direct the grain as it is drawn in and cut inward, so that none of the grain shall scatter or fall over the edge of the divider. This board $D^3$ has battens applied to it, the lower ends of which pass through the divider D¹ and receive nuts on them, so that when desired this board D³ can be readily removed. Near the inner front corner of the platform D is a curved guard or fender, D⁴, which is designed for protecting the gear-wheels (which operate the rake and reel) from becoming tangled with grain.

In front of this guard D⁴ and secured to it and also to the front end of the shoe $b$ is an adjustable guard-arm, E, which is supported and held in position by means of adjustable rods and braces, as shown in Figs. 2 and 6, so that it can be set at any desired angle and raised or depressed.

This inner guard E is for the purpose of gathering up leaning grain and directing it toward the cutting apparatus, so that the entire width of swarth will be cut and caused to fall upon the platform. The platform D is secured to the rear edge of the finger-bar F and to the rear extensions of the outer divider and inner shoe by means of bolts and nuts, so that when the machine is to be used for cutting grass all those parts which are not required for this purpose can be readily removed.

The raking and reeling apparatus is mounted on an arched frame or standard, H, which is secured to the platform, finger-beam, or shoe, (either or all, as may be found most convenient,) in order that the axis of the rake may be nearly over the finger-beam.

In practice, in a front-cut machine I have found it convenient to locate the axis slightly in rear of the finger-beam, as I can thus get the grain farther back with a shorter rake-arm than could otherwise be done. The rake, to secure the best results, should be in front of the main axle, nearly over the finger-beam, and yet be able to reach far enough back to deposit the gavel behind the inner driving-wheel without the stalks becoming entangled in the wheel or the rake-arms striking it. These desiderata determine the precise location of the rake, which must consequently vary slightly, according to the construction of the machine to which it is adapted.

A crown-wheel, J, revolves on a vertical stud, $e$, on the standard H, and is driven by a bevel pinion, $e^2$, mounted on a stud, $e^1$, projecting horizontally from the standard. A block, $f$, is pivoted by a pin, $i$, to two lugs on the pinions $e^2$, and has two link-bars pivoted to it by a pin passing through the block at right angles to the pin $i$, thus forming a gimbal or universal joint or coupling. The other ends of the link-bars $g$ are pivoted to corresponding link-bars $g'$, which are in turn pivoted to a block, $f^1$, pivoted between lugs $f^2$, secured upon the driving-wheel B², on the end of the main axle nearest the rake.

The crown-wheel J, in this instance, is composed of two horizontal sections, the upper one of which is provided with recesses, (arranged at regular intervals opposite each other,) in which radial arms $k$ $l$ are pivoted to play vertically. One of the gatherers or beaters L, or the rake-head, is pivoted to each of these radical arms by a pin, $j$, near its inner end, and by a set-screw or bolt, $j'$, which moves in a slot in the radial arm, and thus permits the rake or beaters to be set nearer to or farther above the platform as required by the condition of the grain. The rake-head L', instead of being secured to a straight arm, K, like the beaters, is pivoted to rock axially in lugs projecting beneath an arm, $l$, bent backward beyond the lugs at almost a right angle and then again bent outward, (as shown in Fig. 6.) The rake is thus radial to its axis of rotation, but has an offset backward in its support.

By this mode of construction the grain is discharged farther back than it could be done with a straight arm. A locking-lever or spring-catch, $p$, on the rake-head prevents it from turning on its axis unless released.

The rake-arm and its opposite beater-arm are united by a link, $m$; the two opposite beater-arms are similarly united by links, $m'$. The movements of the rake and arms are controlled by a guide-cam, M, which extends around about one-half of a circle; its further extension being unnecessary, as the arms which are moving forward are raised up vertically by the cam, and, by means of the connecting-links, hold their corresponding arm down while passing over the platform. The links $m$ $m'$, may be made adjustable in length by making them in two parts, slotting and overlapping the ends, and uniting them by a set-screw or in any other well-known way.

The platform, finger-beam, and raking mechanism rest upon two small supporting-wheels, R S, upon which the platform may be adjusted vertically if desired.

My improvements are to be used on a fully organized machine, but I have herein described only those features relating to my invention, the details of construction of the other parts being well known to all skillful reaper-builders.

In operation, as the machine advances, the beater-arms and rake successively descend into and press the standing grain back upon the cutting apparatus, which severs it, after which it falls upon the platform. The beaters pass over the fallen grain, but when the rake comes round it sweeps the gavel from the platform (turning the stalks at a right angle to the finger-beam during the process) and deposits it upon the ground behind the inner driving-wheel, with its stalks at nearly a right angle to the path of the machine. The grain may be prevented from becoming entangled in the inner driving-wheel by a shield or fender. It will also be observed that the rake and beater-arms are vertical when moving forward, and are at all times outside of the vertical plane of the inner driving-wheel. I am thus enabled to use a short rake-standard, mounted directly on a hinged platform in front of the main axle, without danger of striking the wheels or interfering with the driver. The rake-standard, however, may be made higher or lower, to suit the views of the constructor, in adapting it to the different machines.

I do not claim, broadly, under this application, a combined rake and reel mounted on a hinged platform, as such devices, in a rear-cut machine, are shown in prior patents and applications of my own as well as those of others.

What I claim as my invention, and desire to secure by letters patent, is—

1. The combination, substantially as described, of a main frame supported upon two wheels and a laterally-projecting platform and cutting apparatus, so hinged to the main frame that the cutting apparatus shall be in advance of the main axle, with a series of combined rake and reel arms, all revolving on a vertical axis, or one nearly so, on a support mounted on the platform near its inner front corners, for the purposes set forth.

2. The combination, substantially as described, with a two-wheeled front-cut harvester, of a series of combined rake and reel arms having a vertical axis, or one nearly so, on a standard or support mounted on a hinged platform near its inner front corner, the arms being independently hinged and having a rising and falling movement independent of their axis of rotation, for the purpose set forth.

3. The combination, substantially as described, with a two-wheeled front-cut harvester, of the main frame between the wheels, the intermediate hinged coupling-arms F' G, the cutting apparatus, and the platform, and a series of rake and reel arms pivoted to a crown-wheel or central hub revolving on a vertical axis, and driven by an extensible connection from the main axle, for the purposes set forth.

4. The combination, substantially as described, of two driving-wheels, a frame arranged between the wheels, and projecting beyond their periphery at either end, a laterally-projecting cutting apparatus and platform pivoted to said frame by hinged connections both in front and rear of the wheels, the cutting apparatus being in advance of the main axle, and a combined rake and reel revolving on a vertical axis near the inner front corner of the platform and always revolving outside of the wheels, for the purposes set forth.

5. The combination, substantially as described, in a two-wheeled front-cut hinged-bar machine, of a combined rake and reel mounted on the inner front corner of a platform suspended from the main frame by flexible connections attached to the coupling-arms, and with the lifting devices attached to the rear end of the tongue, for the purposes set forth.

6. Attaching each of the rake or reel-arms to their pivoted shanks by means of a slot and set-screw, or both, so that these arms can be adjusted and set to work at different heights above the platform, to suit different heights of grain, substantially as described.

7. The combination, substantially as described, with a combined rake and reel, mounted on the inner or gearing side of a grain-platform of the divider $D^1$, and inwardly inclined removable deflecting-board $D^3$, for the purposes set forth.

8. The combination, substantially as described, with a revolving rake and reel mounted on a hinged platform, of an adjustable inner grain-guard, E, attached both to the shoe and to the inner curved guard $D^4$, for the purposes set forth.

9. The combination, substantially as described, with a two-wheeled front-cut machine, having a revolving rake and reel mounted upon a hinged platform, of a lateral hinged curved brace or coupling-arm, or its equivalent, attached to the inner side of the platform and main frame in rear of the wheels, and suspended from the main frame by a chain or other flexible connection, for the purposes set forth.

10. The folding joints $g$ $g$, or their equivalents, as a means of communicating motion to rake or reel arms, which are so supported as to move in harmony with a hinged platform, substantially as described.

JAMES S. MARSH.

Witnesses:
JOHN KINGDOM,
EDW. SCHAFER.